(12) United States Patent
Liu et al.

(10) Patent No.: US 8,186,626 B1
(45) Date of Patent: May 29, 2012

(54) GPS BASED ORBIT DETERMINATION OF A SPACECRAFT IN THE PRESENCE OF THRUSTER MANEUVERS

(75) Inventors: Ketao Liu, Cerritos, CA (US); Qinghong W. Wang, Torrance, CA (US); Douglas H. Hein, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 434 days.

(21) Appl. No.: 12/486,989

(22) Filed: Jun. 18, 2009

(51) Int. Cl.
*B64G 1/10* (2006.01)
(52) U.S. Cl. .................. 244/158.8; 701/13
(58) Field of Classification Search ............... 244/158.1, 244/158.4, 158.6–158.8; 701/207, 213, 13
See application file for complete search history.

(56) References Cited

U.S. PATENT DOCUMENTS

| | | | | |
|---|---|---|---|---|
| 6,009,376 | A | * | 12/1999 | Brodie et al. .............. 701/226 |
| 6,553,286 | B2 | * | 4/2003 | Turner et al. ................ 701/13 |
| 2008/0004758 | A1 | * | 1/2008 | Lane .............................. 701/13 |

OTHER PUBLICATIONS

Moreau, M. et al. "Hardware in-the-Loop Demonstration of Real-Time Orbit Determination in High Earth Orbits." ION National Technical Meeting, San Diego, CA, Jan. 24-26, 2005.
Bamford, W. et al. "Real-Time Geostationary Orbit Determination Using the Navigator GPS Receiver." 2005 Flight Mechanics Symposium, Greenbelt, MD, Oct. 18-20, 2005.
Bamford, W. et al. "Navigation Performance in High Earth Orbits Using Navigator GSP Receiver."j American Astronautical Society, 29th Annual AAS Guidance and Control Conference, Feb. 4-8, 2006, Breckenridge, CO.

* cited by examiner

*Primary Examiner* — Joshua J Michener
*Assistant Examiner* — Nicholas McFall
(74) *Attorney, Agent, or Firm* — Charles L. Moore; Moore & Van Allen PLLC

(57) ABSTRACT

A system for determining and controlling an orbit of a spacecraft may include a GPS receiver mounted to the spacecraft to receive GPS information from a plurality of GPS satellites visible to the GPS receiver for determining a position of the spacecraft relative to a reference coordinate system. The system may also include a filter configuration control module to sense a thruster maneuver operation to adjust the orbit of the spacecraft. The system may also include an orbit determination filter to determine at least one of a spacecraft position, velocity, and residue acceleration based on the GPS information and information from the filter configuration control module related to the thruster maneuver operation.

23 Claims, 4 Drawing Sheets

| | | STEADY PHASE | MANEUVER PHASE | TRANSITION PHASE |
|---|---|---|---|---|
| 406 | SMALL DELTA-V & SHORT MANEUVER | 402 • 6 POSITION/VELOCITY STATES, 1 SOLAR PRESSURE STATE, 2 TIME/FREQ STATES LONG FILTER TIME CONSTANT • ORBIT & TIME DETERMINATION PLUS SOLAR PRESSURE CALIBRATION | • 6 POSITION/VELOCITY STATES, 1 SOLAR PRESSURE STATE, 2 TIME & FREQ STATES • SHORT FILTER TIME CONSTANT FOR POSITION/VELOCITY & TIME/FREQ, LONG FILTER TIME CONSTANT FOR SOLAR PRESSURE • ORBIT & TIME DETERMINATION | 408 • 6 POSITION/VELOCITY STATES, 1 SOLAR PRESSURE STATE, 2 TIME/FREQ STATES 'MEDIUM FILTER CONSTANT • ORBIT & TIME DETERMINATION |
| | LARGE DELTA-V & LONG MANEUVER | | • 6 POSITION/VELOCITY STATES, 1 SOLAR PRESSURE STATE, 2 TIME & FREQ STATES, DELTA-V UNCERTAINTY STATES • SHORT FILTER TIME CONSTANT FOR POSITION/VELOCITY, 2 TIME/FREQ & 3 DELTA_V UNCERTAINTY STATES, LONG FILTER TIME CONSTANT FOR SOLAR PRESSURE • ORBIT & TIME DETERMINATION | |
| | LARGE DELTA-V & LONG MANEUVER WITH HIGH QUALITY CLOCK | | • 6 POSITION/VELOCITY STATES, 1 SOLAR PRESSURE STATE, 2 TIME & FREQ STATES, 3 DELTA-V UNCERTAINTY STATES • SHORT FILTER TIME CONSTANT FOR POSITION/VELOCITY & 3 DELTA_V UNCERTAINTY STATES, LONG FILTER TIME CONSTANT FOR SOLAR PRESSURE, & 2 TIME/FREQ STATES • ORBIT & TIME DETERMINATION | |
| | LARGE DELTA-V & LONG MANEUVER WITH ACCELEROMETERS | • 6 POSITION/VELOCITY STATES, 1 SOLAR PRESSURE STATE, 2 TIME/FREQ STATES, 9 ACCELEROMETER SCALING, ALIGNMENT, BIAS STATES • LONG FILTER TIME CONSTANT • ORBIT & TIME DETERMINATION PLUS SOLAR PRESSURE CALIBRATION | • 6 POSITION/VELOCITY STATES, 1 SOLAR PRESSURE STATE, 2 TIME & FREQ STATES • SHORT FILTER TIME CONSTANT FOR POSITION/VELOCITY & 2 TIME/FREQ STATES, LONG FILTER TIME CONSTANT FOR SOLAR PRESSURE • ORBIT & TIME DETERMINATION WITH ACCELEROMETER FEED-FORWARD | |

404

| | STEADY PHASE 402 | MANEUVER PHASE 404 | TRANSITION PHASE 408 |
|---|---|---|---|
| SMALL DELTA-V & SHORT MANEUVER | | • 6 POSITION/VELOCITY STATES, 1 SOLAR PRESSURE STATE, 2 TIME & FREQ STATES<br>• SHORT FILTER TIME CONSTANT FOR POSITION/VELOCITY & TIME/FREQ, LONG FILTER TIME CONSTANT FOR SOLAR PRESSURE<br>• ORBIT & TIME DETERMINATION | |
| LARGE DELTA-V & LONG MANEUVER | • 6 POSITION/VELOCITY STATES, 1 SOLAR PRESSURE STATE, 2 TIME/FREQ STATES<br>• LONG FILTER TIME CONSTANT<br>• ORBIT & TIME DETERMINATION PLUS SOLAR PRESSURE CALIBRATION | • 6 POSITION/VELOCITY STATES, 1 SOLAR PRESSURE STATE, DELTA-V UNCERTAINTY STATES 2 TIME & FREQ STATES<br>• SHORT FILTER TIME CONSTANT FOR POSITION/VELOCITY, 2 TIME/FREQ & 3 DELTA_V UNCERTAINTY STATES, LONG FILTER TIME CONSTANT FOR SOLAR PRESSURE<br>• ORBIT & TIME DETERMINATION | • 6 POSITION/VELOCITY STATES, 1 SOLAR PRESSURE STATE, 2 TIME/FREQ STATES "MEDIUM FILTER CONSTANT<br>• ORBIT & TIME DETERMINATION |
| LARGE DELTA-V & LONG MANEUVER WITH HIGH QUALITY CLOCK | | • 6 POSITION/VELOCITY STATES, 1 SOLAR PRESSURE STATE, 3 DELTA-V UNCERTAINTY STATES 2 TIME & FREQ STATES<br>• SHORT FILTER TIME CONSTANT FOR POSITION/VELOCITY & 3 DELTA_V UNCERTAINTY STATES, LONG FILTER TIME CONSTANT FOR SOLAR PRESSURE, & 2 TIME/FREQ STATES<br>• ORBIT & TIME DETERMINATION | |
| LARGE DELTA-V & LONG MANEUVER WITH ACCELEROMETERS | • 6 POSITION/VELOCITY STATES, 1 SOLAR PRESSURE STATE, 2 TIME/FREQ STATES, 9 ACCELEROMETER SCALING, ALIGNMENT, BIAS STATES<br>• LONG FILTER TIME CONSTANT<br>• ORBIT & TIME DETERMINATION PLUS SOLAR PRESSURE CALIBRATION | • 6 POSITION/VELOCITY STATES, 1 SOLAR PRESSURE STATE, 2 TIME & FREQ STATES<br>• SHORT FILTER TIME CONSTANT FOR POSITION/VELOCITY & 2 TIME/FREQ STATES, LONG FILTER TIME CONSTANT FOR SOLAR PRESSURE<br>• ORBIT & TIME DETERMINATION WITH ACCELEROMETER FEED-FORWARD | |

GPS BASED ORBIT DETERMINATION OF A SPACECRAFT IN THE PRESENCE OF THRUSTER MANEUVERS

FIELD

The present disclosure relates to spacecraft and determining and controlling the orbit of a spacecraft, and more particularly to global positioning satellite (GPS) based orbit determination even in the presence of operation of thrusters for maneuvering the spacecraft.

BACKGROUND

Spacecraft, including satellites and other space vehicles, orbit the earth performing a multitude of different functions and operations, such as links in telecommunications systems, photographing selected geographical areas, sensing or measuring different conditions on the earth, and monitoring weather patterns and conditions, to name a few. The attitude of these spacecraft or orientation relative to the earth and the nature of the orbit may be critical to the proper performance of these spacecraft. Accordingly, being able to accurately determine the attitude, position, orbit, velocity as well as other operating conditions or parameters and being able to control or change these parameters can be highly important. In the case of geostationary or GEO spacecraft or satellites which remain fixed in orbit relative to a location on the earth, determining and controlling the attitude, position, orbit and other operating parameters may be imperative for proper operation. GPS satellites may be used for determining the orbit of spacecraft but use of GPS satellites can present difficulties at time. At GEO orbit, GPS satellite visibility to the GEO orbit spacecraft can sometimes be poor. At other times when a large number of GPS satellites are visible, the geometries or relative positioning of these satellites with respect to the GEO spacecraft may be poor for orbit determination of the GEO spacecraft. Additionally, GEO orbit determination and control in the presence of thruster maneuvers can present additional challenges.

BRIEF SUMMARY

In accordance with an embodiment, a system for determining and controlling an orbit of a spacecraft may include a GPS receiver mounted to the spacecraft. The GPS receiver may receive GPS information from a plurality of GPS satellites visible to the GPS receiver for determining a position of the spacecraft relative to a reference coordinate system. The system may also include a filter configuration control module to sense a thruster maneuver operation to determine and/or adjust the orbit of the spacecraft. The system may additionally include an orbit determination filter to determine at least one of a spacecraft position, velocity, and residue acceleration based on the GPS information and information from the filter configuration control module related to the thruster maneuver operation.

In accordance with an embodiment, a GPS based orbit determination system for controlling GEO thruster maneuvers of a spacecraft may include an orbit propagator to propagate a position and velocity of the spacecraft in an earth centered inertial coordinate system. A filter configuration control module may be provided to sense a thruster maneuver operation and to determine GPS satellite visibility and geometry. The system may also include an orbit determination filter to estimate a spacecraft position, velocity, and residue acceleration based on GPS information and information from the filter configuration control module related to the thruster maneuver operation. The orbit determination filter may provide the estimated spacecraft position, velocity and residue acceleration to the orbit propagator.

In accordance with another embodiment, a spacecraft may include a plurality of actuators for controlling an attitude and orbit of the spacecraft. The spacecraft may also include a GPS based orbit determination system for controlling the orbit of the spacecraft in the presence of thruster maneuvers of the spacecraft.

In accordance with another embodiment, a method for determining and controlling an orbit of a spacecraft may include receiving GPS information from a plurality of GPS satellites visible to a GPS receiver mounted on the spacecraft. The method may also include sensing a thruster maneuver operation to adjust the orbit of the spacecraft. The method may further include determining at least one of a spacecraft position, velocity, and residue acceleration based on the GPS information and information related to the thruster maneuver operation.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the disclosure. Other embodiments having different structures and operations do not depart from the scope of the present disclosure.

FIG. 4 is an exemplary representation of different orbit determination filter states for each phase of a thruster maneuver based on a type of thruster maneuver in accordance with an embodiment of the present disclosure.

DETAILED DESCRIPTION

Figure 1:
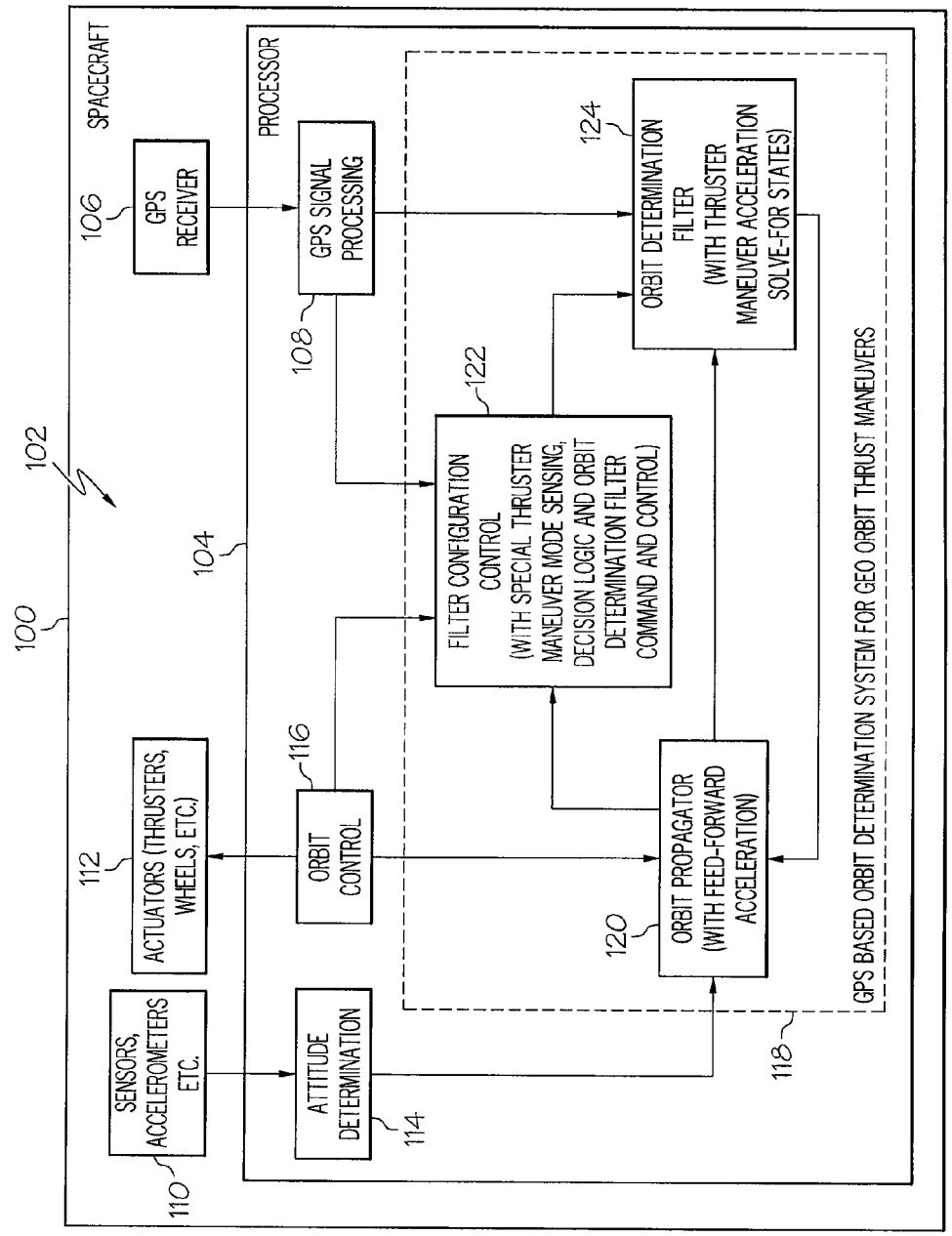
FIG. 1 is a block schematic diagram of an exemplary spacecraft including a system for determining and controlling an orbit of the spacecraft in accordance with an embodiment of the present disclosure.

The following detailed description of embodiments refers to the accompanying drawings, which illustrate specific embodiments of the disclosure. Other embodiments having different structures and operations do not depart from the scope of the present disclosure.

As will be appreciated by one of skill in the art, features of the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any combination of one or more computer-readable medium(s) may be utilized. The computer-readable medium may be a computer readable signal medium or a computer readable storage medium. A computer-readable storage medium may be, for example, but not limited to, an electronic, magnetic, optical, electromagnetic, infrared, or semiconductor system, apparatus, a device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Note that the computer-readable storage medium could even be paper or another suitable medium upon which a program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable storage medium may be any medium that can contain, or store a program for use by or in connection with an instruction execution system, apparatus, or device.

A computer readable signal medium may include a propagated data signal with computer-usable program code embodied therein, for example, in base band or as part of a carrier wave. Such a propagated signal may take any of a variety of forms, including, but not limited to, electro-magnetic, optical, or any suitable combination thereof, A computer readable signal medium may be any computer-readable medium that can contain, store, communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages, or in functional programming languages, such as Haskell, Standard Meta Language (SML) or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block schematic diagram of an exemplary spacecraft 100 including a system 102 for determining and controlling an orbit of the spacecraft 100 in accordance with an embodiment of the present disclosure. The spacecraft 100 may include a processor 104 or control processor for controlling operation of the spacecraft and for performing the functions or operations described herein.

A GPS receiver 106 may be mounted to the spacecraft 100 to receive GPS signals or information from any GPS satellites that may be visible to the GPS receiver 106 for determining a position or orbit of the spacecraft 100 relative to a reference coordinate system. A GPS signal processing module 108 may process the GPS information received by the GPS receiver 106. The GPS signal processing module 108 may determine the position of each GPS satellite visible to the spacecraft 100 or GPS receiver 106. Other functions the GPS signal processing module 108 may perform may include determining tracking status of each GPS satellite visible to the spacecraft 100, determining a range or pseudo-range of each GPS satellite visible to the spacecraft 100, determining a range rate of each GPS satellite visible to the spacecraft 100, determining ephemeris of the visible GPS satellites, and time.

The spacecraft 100 may also include sensors 110 and actuators 112 for determining an attitude of the spacecraft 100 and for controlling the attitude and movement of the spacecraft 100 for orbit control. Examples of sensors 110 may include accelerometers, inertial reference units (IRUs) including gyroscopes corresponding to each of the three orthogonal axes of movement of the spacecraft 100, as well as other attitude or motion sensors. The gyroscopes of gyros may be used to measure angular velocity about each axis.

Examples of actuators 112 may include propulsion devices or thrusters, motorized wheels or similar devices. Propulsion devices or thrusters can be commanded to fire under computer control to provide the desired attitude, angular velocity and orbit of the spacecraft 100. Propulsion devices or thrusters are not used unless absolutely necessary because of the limited quantity of fuel onboard the spacecraft 100.

Motorized wheels may be used to rotate the spacecraft 100 about a selected axis. A motorized wheel may be associated with each of the three orthogonal axes of motion of the spacecraft 100. The motorized wheel may be commanded to spin in a chosen direction (clockwise or counterclockwise) to cause the spacecraft 100 to spin in an opposite direction about the selected axis because of conservation of momentum.

An attitude determination module 114 may be operable on the processor 104 to receive information from the sensors 110 to determine the attitude of the spacecraft 100 relative to some fixed frame of reference, such as an orientation to the earth or some other target.

An orbit control module 116 may also be operable on the processor 104 to control the actuators 112 to control an attitude and orbit of the spacecraft 100. The orbit control module 116 may control operation of at least one thruster to control the orbit of the spacecraft 100 and for maintaining a desired orbit.

A GPS based orbit determination system 118 for controlling GEO orbit thrust maneuvers may also be operable on the processor 104. The GPS based orbit determination system 118 may include an orbit propagator module 120 or orbit propagator, a filter configuration control module 122, and an orbit determination filter 124. The orbit propagator 120, filter configuration control module 122 and orbit determination filter 124 may be software units on the processor 104. The processing and interfaces between the orbit propagator 120, filter configuration module 122 and orbit determination filter 124 constitute or define the GPS based orbit determination system 118 for controlling GEO orbit thruster maneuvers.

Figure 2:
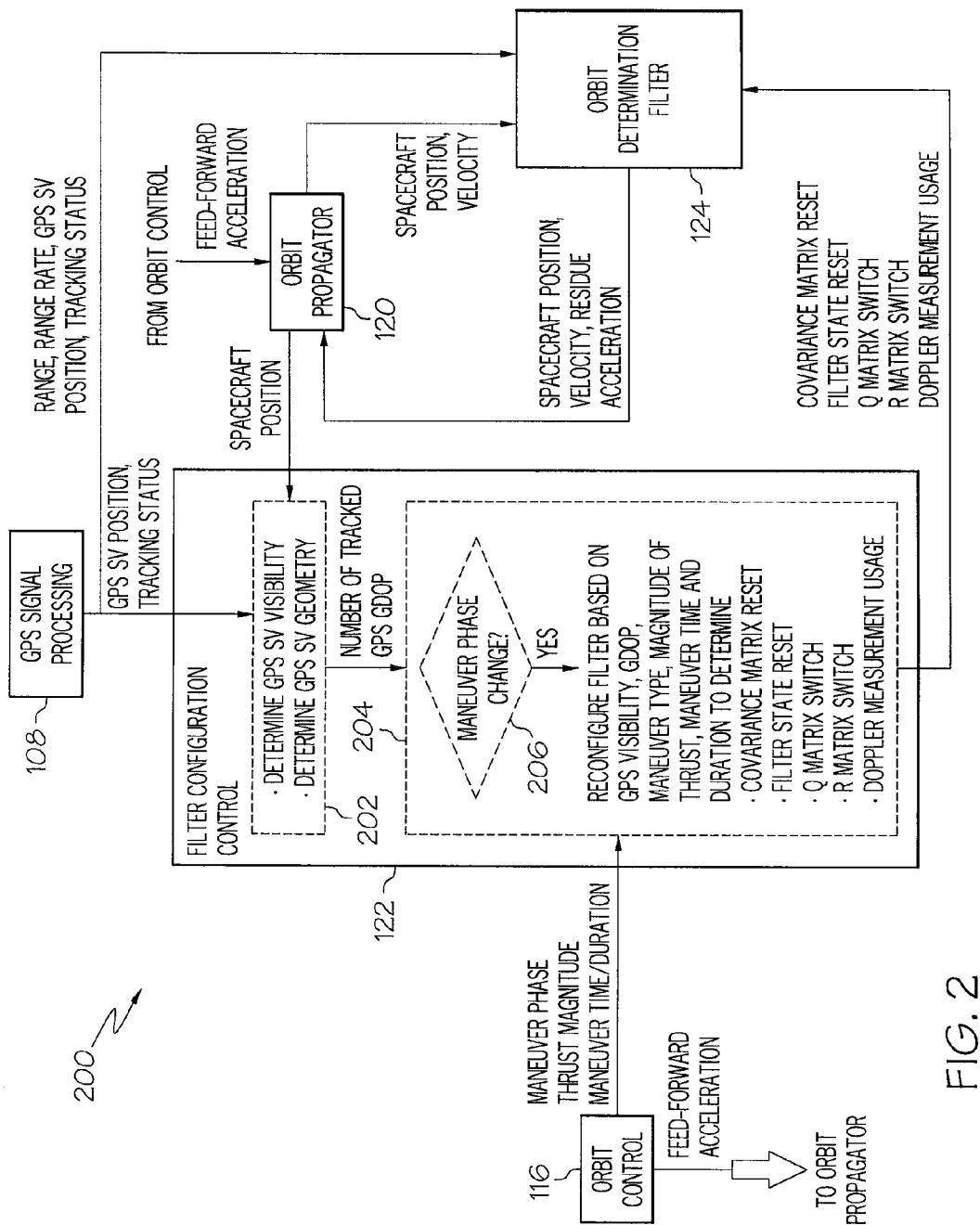
FIG. 2 is a flow chart of an example of a method for GPS based orbit determination in accordance with an embodiment of the present disclosure.

The functions and operations of the different components in FIG. 1 will be described with reference also to FIG. 2. FIG. 2 is a flow chart of an example of a method 200 for GPS based orbit determination in accordance with an embodiment of the present disclosure. The orbit propagator 120 receives orbit control information or data from the orbit control module 116. The orbit control information may include thruster data, such as thrust magnitude, thrust duration and similar information for orbit control including feed-forward acceleration data for a thruster maneuver operation. The feed-forward acceleration may include two parts. A first part may be based on a thrust imparted to the spacecraft and a mass of the spacecraft. A second part of the feed-forward acceleration may include a residue acceleration estimated by the orbit determination filter 124.

The orbit propagator 120 may numerically integrate equations of motion of the spacecraft 100 to obtain the position and velocity of the spacecraft 100 in an Earth Centered Inertial (ECI) coordinate system. The equations of motion may include but are not necessarily limited to: accelerations due to an earth gravitational field or effects of the earth's gravity on the spacecraft 100; a differential gravitational attraction of the sun or effects of the sun's gravity on the spacecraft 100; a differential gravitational attraction of the moon; a solar pressure model (a model of the orbit-perturbing force exerted by solar radiant energy), and effects of precession and nutation of the earth. In particular, the equations of motion include the feed-forward acceleration for the thruster maneuver operation. The orbit propagator 120 may also integrate the time drift based on the estimated frequency of an on board oscillator.

The filter configuration control module 122 provides thruster maneuver mode sensing, decision logic, and command and control of the orbit determination filter 124. The filter configuration control module 122 receives GPS satellite position information and tracking status of GPS satellites visible to the GPS receiver 106 from the GPS signal processing module 108. The filter configuration control module 122 also receives spacecraft position information from the orbit propagator 120. From this information, the filter configuration control module 122 may determine in block 202 the number of GPS satellites visible or being tracked by the spacecraft 100 based on the tracking status and may also determine the geometry of the visible GPS satellites or the geometric dilution of precision (GDOP) of the tracked GPS satellites relative to the spacecraft 100.

The number of tracked GPS satellites and the GDOP data may be sent to a second block 204 in the filter configuration control module 122. In the event of a thruster maneuver operation, the filter configuration control module 122 may also receive data or information related to maneuver phase thrust magnitude, maneuver time and/or duration and any other related thruster maneuver operation information from the orbit control module 116.

In block 206 of the filter configuration control module 122, a determination may be made whether a maneuver phase change or a thruster maneuver operation has occurred or is occurring. If a maneuver phase change or thruster maneuver operation has occurred, the filter configuration control module 122 may determine a set of parameters for reconfiguring the orbit determination filter 124 based on the visibility of the GPS satellites to the spacecraft 100, a geometric dilution of precision of the GPS satellites relative to the spacecraft 100, a magnitude of thrust of the thruster maneuver operation, and a duration of the thruster maneuver operation.

The orbit determination filter 124 may be an extended Kalman filter or similar filter. The parameters for reconfiguring the orbit determination filter 124 may then include a set of parameters for reconfiguring the extended Kalman filter, as described herein. The set of parameters from the filter configuration control module 122 may include: a covariance matrix P reset flag for resetting a covariance matrix P in the orbit determination filter 124 or extended Kalman filter, if the covariance matrix reset flag is set; a filter states X reset flag for resetting filter states X in the orbit determination filter 124 or extended Kalman filter; a process noise covariance matrix switch flag for switching filter parameter Q; and a measurement error or noise covariance matrix switch flag for switching filter parameter R. A Doppler measurement usage flag may also be set by the filter configuration control module 122 for using a Doppler measurement from each GPS satellite being tracked by the spacecraft 100 if the Doppler measurement usage flag is set.

The orbit determination filter 124 or extended Kalman filter may also receive the range, range rate, position of each GPS satellite, and the tracking status of each GPS satellite visible to the spacecraft 100 from the GPS signal processing module 108.

A Kalman filter is an efficient recursive filter that can estimate the state of a linear dynamic system from a series of noisy measurements. For example, the Kalman filter can provide substantially accurate, continuously updated information about the position and velocity of an object given only a sequence of observations about the objects position, each of which may include some error. The Kalman filter uses a state transition model to define a current state $X_k$ in matrix form of the object based on a previous state $X_{k-1}$ and an observation model z. In the extended Kalman filter, the state transition model and the observation model do not need to be linear functions of the state but may be differentiable functions. The orbit determination filter 124 may then take the form of an extended Kalman filter based on the state and observation models represented in Equations 1 and 2, respectively:

$$\dot{X} = F(X, u) + w \qquad \text{Eq. 1}$$

$$z = h(X) + v \qquad \text{Eq. 2}$$

The state transition and observation models at a discrete time may be represented by Equations 3 and 4:

$$X_k = f(x_{k-1}, u) + w_k \qquad \text{Eq. 3}$$

$$Z_k = h(X_k) + v_k \qquad \text{Eq. 4}$$

In equations 3 and 4, $w_k$ and $V_k$ are the process and observation noise with covariance $Q_k$ and $R_k$, respectively. The subscript k represents the values at observation or measurement time $t_k$.

The computation of the extended Kalman filter consists of the following steps:
First, the predicted state from the orbit propagator module 120 is obtained as represented by Equation 5:

$$\overline{X}_k = f(\hat{X}_{k-1}, u) \qquad \text{Eq. 5}$$

Time matching may be performed to obtain the predicted state at the observation time.
Next, a state transition matrix $\phi(t_k, t_{k-1})$ satisfying Equation 6 is computed:

$$\dot{\phi}(t, t_{k-1}) = \frac{\partial F}{\partial X} \phi(t, t_{k-1}), \, \phi(t_{k-1}, t_{k-1}) = I \qquad \text{Eq. 6}$$

The propagated covariance matrix for the extended Kalman filter may be determined as represented by Equation 7:

$$\overline{P}_k = \phi(t_k, t_{k-1}) P_{k-1} \phi^T(t_k, t_{k-1}) \qquad \text{Eq. 7}$$

The observation is computed next according to Equation 8:

$$y_k = z_k - h(\overline{X}_k) \qquad \text{Eq. 8}$$

The observation-state matrix may be computed according to Equation 9:

$$H_k = \left. \frac{\partial h}{\partial X} \right|_{\overline{X}_k} \qquad \text{Eq. 9}$$

The gain matrix for the extended Kalman filter is then computed as provided by Equation 10:

$$K_k = \overline{P}_k H_k^T (H_k \overline{P}_k H_k^T + R_k)^{-1} \qquad \text{Eq. 10}$$

The updated state estimate and covariance matrix for the extended Kalman filter or orbit determination filter are then represented by Equations 11 and 12, respectively:

$$\hat{X}_k = \overline{X}_k + K_k y_k \qquad \text{Eq. 11}$$

$$P_k = (I - K_k H_k) \overline{P}_k \qquad \text{Eq. 12}$$

The orbit determination filter 124 or extended Kalman filter may be built or designed with flexible and reconfigurable features for GEO spacecraft thruster maneuvers. As previously discussed, the orbit determination filter 124 or extended Kalman filter includes a filter state and an observation model. The filter state may include a spacecraft position, a spacecraft velocity, a clock drift and frequency, and a thruster residue acceleration. A solar pressure state may also be included in the filter state. The estimated spacecraft position, velocity and thruster residue acceleration are feed to the orbit propagator 120. The estimated thruster residue accelerations may also be used for thruster calibration to update the feed-forward acceleration for use by the orbit propagator 120. The filter state reset flag from the filter configuration control module 122 determines whether or not to estimate thruster residue accelerations.

The observation model of the orbit determination filter 124 or extended Kalman filter may include pseudo-range measurements from each GPS satellite being tracked by the spacecraft 100. The observation model may also include Doppler measurements from the GPS receiver 106 and acceleration measurements from accelerometers 110. The Doppler usage flag from the filter configuration control module 122 controls what observation data and observation-state matrix is used in the orbit determination filter 124.

The covariance matrix is propagated and updated in each filter processing cycle. When the reset filter covariance flag is set, the covariance matrix is re-initialized in the orbit determination filter 124 with a predetermined value picked from a parameter database.

The process and measurement noise covariance matrices Q and R, respectively, are filter parameters. Their values are functions of the maneuver phase, such as steady state, thruster operation (Delta V), or transition. When the Q or R switch flag is set, the proper parameters are picked from a parameter database.

Figure 3:
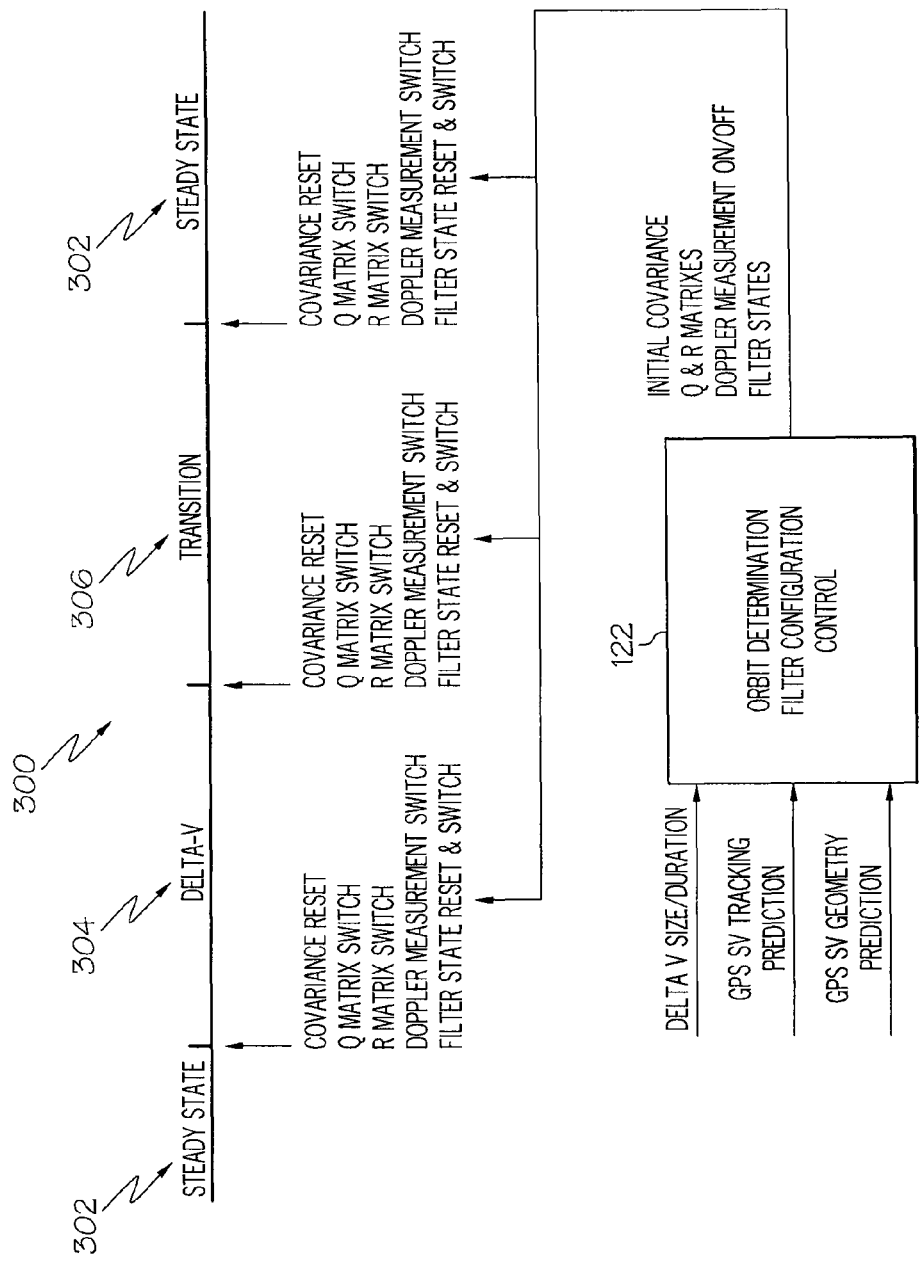
FIG. 3 is an exemplary representation of a configuration of an orbit determination filter in accordance with another embodiment of the present disclosure.

FIG. 3 is an exemplary representation of a configuration 300 of an orbit determination filter 124 in accordance with an embodiment of the present disclosure. As illustrated in FIG. 3, the orbit determination filter 124 may be divided into several stages corresponding to maneuver phases depending upon what operations or events may be occurring. The maneuver phases may be referred to as a Steady State phase 302, a Delta-V maneuver phase 304 and a Transition phase 306. During the Steady State phase 302, in the absence of thruster firing, the state of the orbit determination filter follows closely the true orbit of the spacecraft. The Delta-V phase 304 is a thruster operating phase during which thrusters are fired at a preset magnitude for a predetermined duration to adjust the obit or position of the spacecraft 100 and/or attitude of the spacecraft 100. The Transition phase 306 is the post thruster maneuver or operating phase while the orbit determination filter settles the thruster firing induced estimation error and again reaches a Steady State phase 302.

The orbit determination filter 124 is reconfigured upon detection of each maneuver phase change. The filter state and parameters are determined based on the size and duration of the thruster maneuver or operation, the predicted or estimated GPS satellite visibility and geometry as previously described.

FIG. 4 is an exemplary representation 400 of the different orbit determination filter states for each phase of a thruster maneuver based on a type of thruster maneuver in accordance with an embodiment of the present disclosure. The different filter states are indicated in each cell 402 corresponding to the maneuver phase 404 for each column and the type of thruster maneuver 406 corresponding to each row. For example, the different filter states for any of the type thruster maneuvers 406 and for the transition phase in cell 408 may include six position/velocity states, one solar pressure state, two time/frequency states, a medium filter time constant and an orbit and time determination state.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A system for determining and controlling an orbit of a spacecraft, comprising:
   a GPS receiver mounted to the spacecraft to receive GPS information from a plurality of GPS satellites visible to the GPS receiver for determining a position of the spacecraft relative to a reference coordinate system;
   a filter configuration control module to sense a thruster maneuver operation to adjust the orbit of the spacecraft; and
   an orbit determination filter to determine at least one of a spacecraft position, velocity, and residue acceleration based on the GPS information and information from the filter configuration control module related to the thruster maneuver operation, wherein the orbit determination filter is in a different orbit determination filter state for each phase of the thruster maneuver operation based on a type of thruster maneuver operation and based at least on the GPS information and the information from the filter configuration control module.

2. The system of claim 1, wherein the filter configuration control module controls reconfiguration of the orbit determination filter based on a visibility of the GPS satellites to the spacecraft, a geometric dilution of precision of the GPS satellites relative to the spacecraft, a magnitude of thrust of the thruster maneuver operation, and a duration of the thruster maneuver operation.

3. The system of claim 1, further comprising a GPS signal processing module to process the GPS information received by the GPS receiver to determine a position of each GPS satellite visible to the spacecraft in an ECI coordinate system, a tracking status of each GPS satellite visible to the spacecraft, a range of each GPS satellite visible to the spacecraft and a range rate of each GPS satellite visible to the spacecraft, wherein the filter configuration control module receives the position of each GPS satellite and the tracking status of each GPS satellite visible to the spacecraft from the GPS signal processing module and the orbit determination filter receives the range, range rate, position of each GPS satellite, and the tracking status of each GPS satellite visible to the spacecraft from the GPS signal processing module.

4. The system of claim 1, further comprising an orbit control module to control actuators to control an attitude of the spacecraft and operation of at least one thruster for controlling an orbit of the spacecraft, wherein the orbit control module provides maneuver operation thrust magnitude and thrust duration information to the filter configuration control module.

5. The system of claim 1, further comprising an orbit propagator module to propagate a position and velocity of the spacecraft in an ECI coordinate system.

6. The system of claim 5, wherein the orbit propagator module is adapted to integrate a set of equations of motion of the spacecraft to determine the position and velocity of the spacecraft in the ECI coordinate system.

7. The system of claim 6, wherein the set of equations of motion of the spacecraft comprise accelerations due to an earth gravitational field, a differential gravitational attraction of the sun, a differential gravitational attraction of the moon, a solar pressure model, a feed-forward acceleration for the thruster maneuver operation, and effects of precession and nutation of the earth.

8. The system of claim 7, wherein the feed-forward acceleration comprises a first part based on a thrust and mass of the spacecraft and a second part comprising a residue acceleration from the orbit determination filter.

9. The system of claim 7, wherein the orbit propagator module is adapted to integrate a time drift of the spacecraft based on estimated frequency of an on board oscillator.

10. The system of claim 1, wherein the orbit determination filter comprises an extended Kalman filter.

11. The system of claim 10, wherein a filter state of the extended Kalman filter comprises the spacecraft position, velocity, clock drift and frequency, and thruster residue acceleration, and wherein an observation model of the extended Kalman filter comprises pseudo-range measurement of each of the GPS satellites.

12. The system of claim 11, wherein the observation model of the extended Kalman filter further comprises a Doppler measurement for each GPS satellite from the GPS receiver and an acceleration measurement from an accelerometer, wherein a Doppler measurement usage flag controls what observation data and observation-state matrix are used in the extended Kalman filter.

13. A GPS based orbit determination system for controlling GEO thruster maneuvers of a spacecraft, comprising:
   an orbit propagator to propagate a position and velocity of the spacecraft in an earth centered inertial coordinate system;
   a filter configuration control module to sense a thruster maneuver operation and to determine GPS satellite visibility and geometry; and
   an orbit determination filter to estimate a spacecraft position, velocity, and residue acceleration based on GPS information and information from the filter configuration control module related to the thruster maneuver operation, wherein the orbit determination filter provides the estimated spacecraft position, velocity, and residue acceleration to the orbit propagator and wherein the orbit determination filter is in a different orbit determination filter state for each phase of the thruster maneuver operation based on a type of thruster maneuver operation and based at least on the GPS information and the information from the filter configuration control module.

14. The GPS based orbit determination system of claim 13, wherein the filter configuration control module controls reconfiguration of the orbit determination filter based on a visibility of the GPS satellites to the spacecraft, a geometric dilution of precision of the GPS satellites relative to the spacecraft, a magnitude of thrust of the thruster maneuver operation, and a duration of the thruster maneuver operation.

15. The GPS based orbit determination system of claim 13, wherein the filter configuration control module determines a set of parameters for reconfiguring the orbit determination filter, wherein the set of parameters comprises a covariance matrix reset flag for resetting a covariance matrix in the orbit determination filter if set, a filter state reset flag for resetting a filter state in the orbit determination filter if set, a process noise covariance switch flag for switching filter parameter Q if set, a measurement noise covariance switch flag for switching filter parameter R if set, and a Doppler measurement usage flag for using a Doppler measurement from each GPS satellite being tracked by the spacecraft if the Doppler measurement usage flag is set.

16. The GPS based orbit determination system of claim 15, wherein the orbit determination filter comprises:
   a filter state comprising a spacecraft position, a spacecraft velocity, a clock drift and frequency, and a thruster residue acceleration, wherein the estimated spacecraft position, velocity and residue acceleration are feed to the obit propagator; and an observation model comprising a pseudo-range measurement from each GPS satellite being tracked by the spacecraft.

17. The GPS based orbit determination system of claim 13, wherein the orbit propagator is adapted to integrate a set of equations of motion of the spacecraft to determine the propagated position and velocity of the spacecraft in the ECI coordinate system.

18. A spacecraft, comprising:
a plurality of actuators for controlling an attitude and orbit of the spacecraft; and
a GPS based orbit determination system for controlling the orbit of the spacecraft in the presence of thruster maneuvers of the spacecraft, wherein the GPS based orbit determination system comprises:
an orbit propagator to propagate a position and velocity of the spacecraft in an earth centered inertial coordinate system;
a filter configuration control module to sense a thruster maneuver operation and to determine GPS satellite visibility and geometry; and
an orbit determination filter to estimate a spacecraft position, velocity and residue acceleration based on GPS information and information from the filter configuration control module related to the thruster maneuver operation, wherein the orbit determination filter provides the estimated spacecraft position, velocity and residue acceleration to the orbit propagator and wherein the orbit determination filter is in a different orbit determination filter state for each phase of the thruster maneuver operation based on a type of thruster maneuver operation and based at least on the GPS information and the information from the filter configuration control module.

19. A method for determining and controlling an orbit of a spacecraft, comprising:
receiving GPS information from a plurality of GPS satellites visible to a GPS receiver mounted on the spacecraft;
sensing a thruster maneuver operation to adjust the orbit of the spacecraft;
determining at least one of a spacecraft position, velocity, and residue acceleration based on the GPS information and information related to the thruster maneuver operation; and
configuring an orbit determination filter in a different orbit determination filter state for each phase of the thruster maneuver operation based on a type of thruster maneuver operation and based at least on the GPS information and the information from a filter configuration control module.

20. The method of claim 19, further comprising controlling reconfiguration of the orbit determination filter based on a visibility of the GPS satellites to the spacecraft, a geometric dilution of precision of the GPS satellites relative to the spacecraft, a magnitude of thrust of the thruster maneuver operation, and a duration of the thruster maneuver operation.

21. The method of claim 20, wherein controlling reconfiguration of the orbit determination filter comprises determining a set of parameters for reconfiguring the orbit determination filter.

22. The method of claim 21, wherein determining the set of parameters for reconfiguring the orbit determination filter comprises:
determining a covariance matrix reset flag for resetting a covariance matrix in the orbit determination filter if the covariance reset flag is set;
determining a filter state reset flag for resetting a filter state in the orbit determination filter if the filter state reset flag is set;
determining a process noise covariance switch flag for switching filter parameter Q if the process noise covariance switch flag is set;
determining a measurement noise covariance switch flag for switching filter parameter R if the measurement noise covariance switch flag is set; and
determining a Doppler measurement usage flag for using a Doppler measurement from each GPS satellite being tracked by the spacecraft if the Doppler measurement usage flag is set.

23. The method of claim 22, further comprising:
forming a filter state of the orbit determination filter, wherein the filter state comprises a spacecraft position, a spacecraft velocity, a clock drift and frequency, and a thruster residue acceleration, wherein the estimated spacecraft position, velocity and residue acceleration are feed to the obit propagator; and
forming an observation model of the orbit determination filter, wherein the observation model comprises a pseudo-range measurement from each GPS satellite being tracked by the spacecraft.

* * * * *